(12) United States Patent
Salter et al.

(10) Patent No.: US 10,953,789 B2
(45) Date of Patent: Mar. 23, 2021

(54) AUTONOMOUS DELIVERY VEHICLE WITH EXTERIOR SCANNING SYSTEM

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); Pietro Buttolo, Dearborn Heights, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/647,570

(22) PCT Filed: Sep. 22, 2017

(86) PCT No.: PCT/US2017/052898
§ 371 (c)(1),
(2) Date: Mar. 16, 2020

(87) PCT Pub. No.: WO2019/059921
PCT Pub. Date: Mar. 28, 2019

(65) Prior Publication Data
US 2020/0262338 A1    Aug. 20, 2020

(51) Int. Cl.
*B60Q 1/50*    (2006.01)
*B60Q 1/26*    (2006.01)
(Continued)

(52) U.S. Cl.
CPC ......... *B60Q 1/503* (2013.01); *B60Q 1/2661* (2013.01); *B60Q 1/50* (2013.01); *B60R 1/12* (2013.01);
(Continued)

(58) Field of Classification Search
CPC . B60Q 1/50; B60Q 1/503; B60Q 1/26; B60Q 1/2661; B60Q 1/2665; B60R 1/02;
(Continued)

(56) References Cited

U.S. PATENT DOCUMENTS 9,256,852 B1    2/2016  Myllymaki
9,373,149 B2    6/2016  Abhyanker
(Continued)

FOREIGN PATENT DOCUMENTS

CA        2 954 156 A1    6/2014

OTHER PUBLICATIONS

International Search Report of the International Searching Authority for PCT/US2017/052898 dated Dec. 1, 2017.

*Primary Examiner* — Van T Trieu
(74) *Attorney, Agent, or Firm* — Gregory P. Brown; Brooks Kushman P.C.

(57) ABSTRACT

A vehicle includes a storage compartment configured to house a package for delivery and a side-mirror assembly. The side-mirror assembly includes an imager and a puddle light aimed to illuminate an area in a field of view of the imager. A vehicle controller is programmed to receive data representing a code associated with the delivery, energize the puddle lamp to illuminate the area, and unlock the storage compartment responsive to the imager detecting an image encoding data matching the code.

20 Claims, 7 Drawing Sheets

(51) Int. Cl.
*B60R 1/12* (2006.01)
*G06Q 10/08* (2012.01)
B60R 25/24 (2013.01)
*B60Q 1/32* (2006.01)

(52) U.S. Cl.
CPC ........... *G06Q 10/083* (2013.01); *B60Q 1/323* (2013.01); *B60Q 2400/10* (2013.01); *B60Q 2400/50* (2013.01); *B60R 25/24* (2013.01); *B60R 2001/1253* (2013.01)

(58) Field of Classification Search
CPC ..... B60R 1/06; B60R 1/12; B60R 2001/1215; B60R 2001/1276
See application file for complete search history.

(56) References Cited

U.S. PATENT DOCUMENTS

| | | |
|---|---|---|
| 9,412,280 B1 | 8/2016 | Zwillinger et al. |
| 9,552,564 B1 | 1/2017 | Martenis |
| 10,387,824 B2 | 8/2019 | Gillen et al. |
| 2002/0180580 A1* | 12/2002 | Gotfried .............. A47G 29/141 340/5.2 |
| 2006/0061459 A1* | 3/2006 | Kawamura ........ G07C 9/00309 340/426.36 |
| 2014/0180959 A1 | 6/2014 | Gillen et al. |
| 2014/0218212 A1 | 8/2014 | Nykerk |
| 2015/0006005 A1 | 1/2015 | Yu et al. |
| 2015/0120602 A1* | 4/2015 | Huffman ............ G06Q 10/0836 705/339 |
| 2015/0242811 A1 | 8/2015 | Gillen et al. |
| 2015/0298598 A1 | 10/2015 | Nüssli |
| 2016/0185466 A1 | 6/2016 | Dreano, Jr. |
| 2017/0123421 A1 | 5/2017 | Kentley et al. |
| 2017/0213308 A1 | 7/2017 | Wellborn et al. |
| 2018/0005169 A1* | 1/2018 | High ................ G06Q 10/06315 |
| 2019/0392389 A1 | 12/2019 | Gillen et al. |

* cited by examiner

AUTONOMOUS DELIVERY VEHICLE WITH EXTERIOR SCANNING SYSTEM

CROSS-REFERENCE TO RELATED APPLICATION

This application is the U.S. national phase of PCT Application No. PCT/US2017/052898 filed Sep. 22, 2017, the disclosure of which is hereby incorporated in its entirety by reference herein.

TECHNICAL FIELD

This disclosure relates to autonomous vehicles configured to deliver packages without a human driver. The vehicle includes systems for securing the packages from unauthorized individuals and for providing access to the packages to intended recipients.

BACKGROUND

The delivery of goods, e.g., packages, food, and the like, to residences and businesses is common place today. Typically, a person manually drives a vehicle to the recipient's home or business and hand delivers the goods to a receiving location such as the front door. The advent of autonomous vehicles enables the possibility of autonomous delivery vehicles that do not require a human driver. Autonomous delivery vehicles without a human driver may require systems that allow recipients to gain access to their deliveries while also guarding against theft.

SUMMARY

According to one embodiment, a vehicle includes a storage compartment configured to house a package for delivery and a side-mirror assembly. The side-mirror assembly includes an imager and a puddle light aimed to illuminate an area in a field of view of the imager. A vehicle controller is programmed to receive data representing a code associated with the delivery, energize the puddle lamp to illuminate the area, and unlock the storage compartment responsive to the imager detecting an image encoding data matching the code.

According to another embodiment, a vehicle includes a body having a storage compartment configured to house an item for delivery. The storage compartment has an electronically controlled lock. A vehicle scanning assembly is disposed on an outer surface of the body and includes an imager configured to read an image encoding data and a light source configured to illuminate an area in a field of view of the imager. A controller is programmed to, receive data representing a code associated with the delivery, energize the light source to display a message related to the delivery responsive to a remote device of an intended recipient of the delivery being within a threshold distance of the vehicle, and unlock the lock responsive to the imager detecting an image encoding data displayed by the remote device that matches the code so that the intended recipient can access the item in the storage compartment.

According to yet another embodiment, a vehicle includes a body having a storage compartment for housing a package, and a scanning assembly connected to the body and having an imager configured to read a barcode displayed by a remote device. A controller is programmed to receive an access code, from a remote server, for the storage compartment, and unlock the storage compartment responsive to the imager sensing a barcode, displayed by the remote device, that matches the access code.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
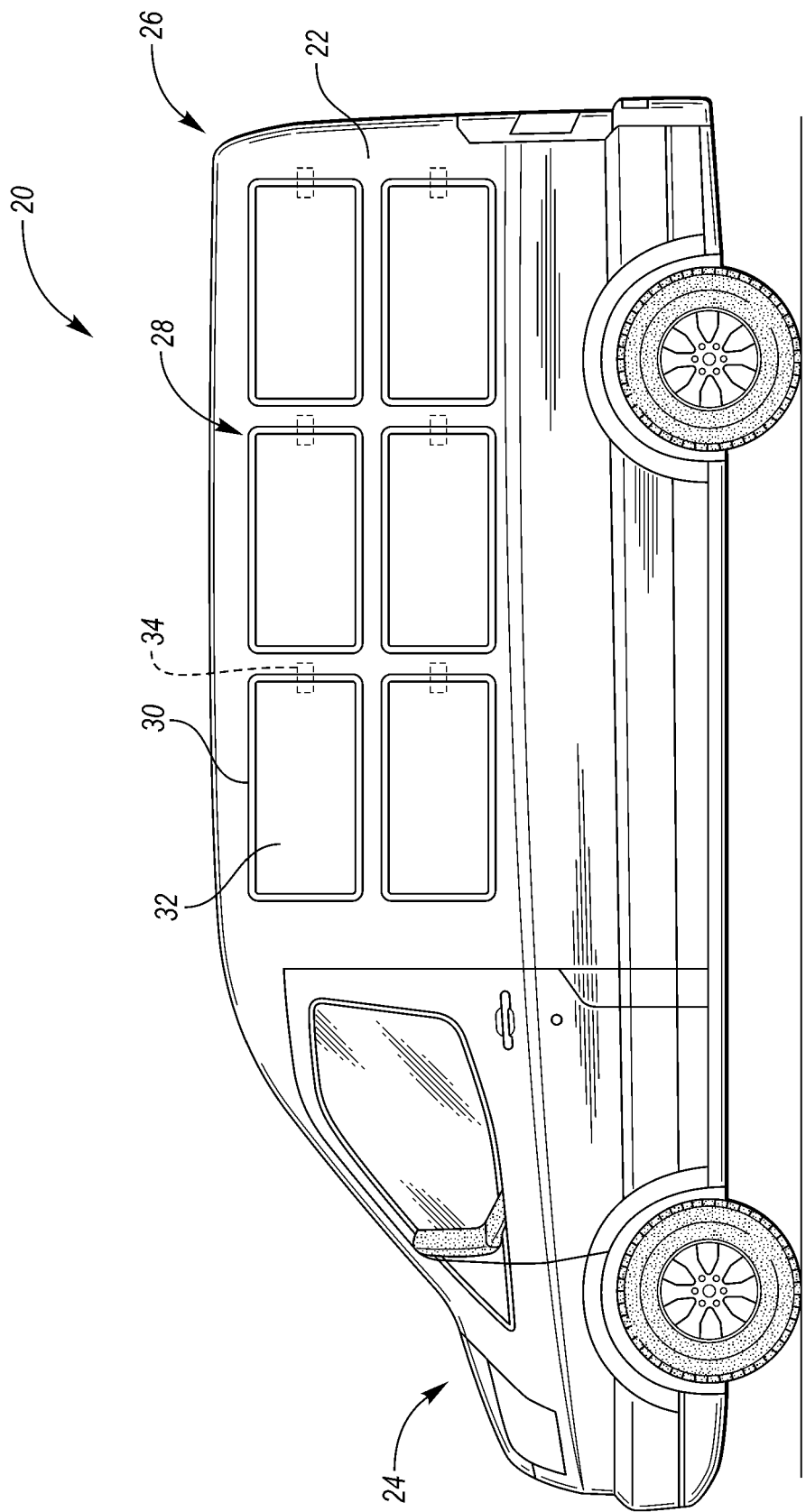
FIG. 1 is a schematic diagram of an example autonomous delivery vehicle.

Referring to FIG. 1, a vehicle 20, such as an autonomous delivery vehicle, includes a body structure 22 having a front end 24 and a rear end 26. One or more actuators, e.g., internal combustion engine, electric machine, or both, may be disposed in an engine compartment generally located at the front end 24. A storage system 28 may be located near the rear end 26 and includes a plurality of storage compartments 30 for housing items for delivery such as packages, food, and the like.

Each storage compartment 30 may include a cavity for receiving one or more items and a lockable door 32 that selectively opens and closes the cavity to secure the item(s) therein. The door 32 may be secured by a lock 34 to prevent unauthorized users from accessing items within the cavity. The lock 34 is electronically controllable and can be unlocked by the vehicle. For example, the lock 34 may include a solenoid that actuates the lock to the unlocked position in response to an electric signal from a controller of the vehicle. The door 32 may be configured to automatically open in response to the lock 34 being unlocked, or the door 32 may include a latch (not shown) that secures the door in the closed position until a person manually opens the door 34.

The vehicle 20 may include artificial intelligence capable of autonomously driving the vehicle on public roadways. The vehicle 20 may include sensors, Radar, Lidar, and cameras that enable the vehicle to view the area around the vehicle in order to navigate autonomously. The vehicle 20 may further include a GPS module for receiving road data, map data, and directions including delivery routes. The vehicle 20 is able to use these systems to autonomously drive the vehicle 20 to various destinations so that goods may be delivered to homes or businesses without the use of a human driver.

Figure 2:
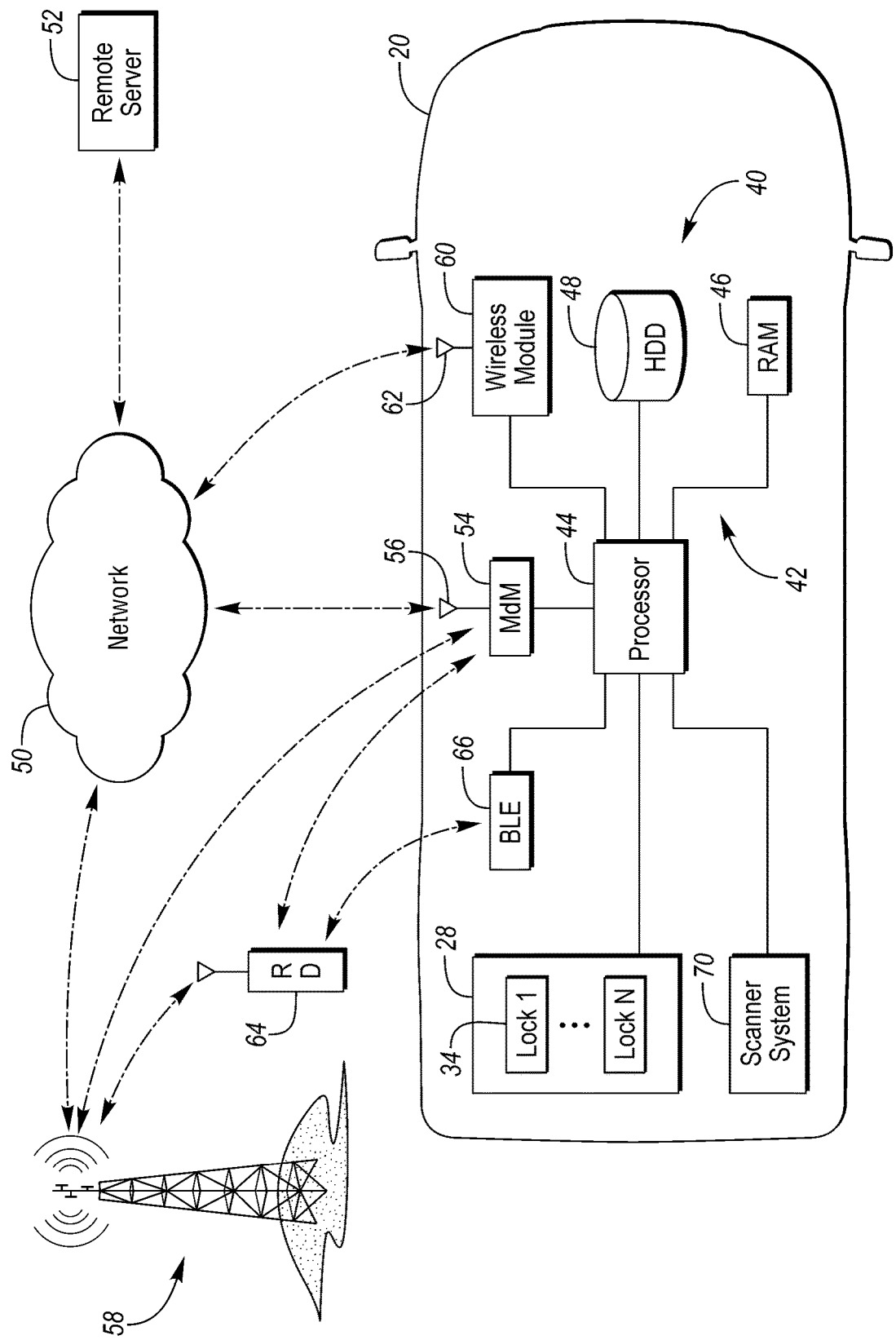
FIG. 2 shows an example vehicle computing system and a remote network.

FIG. 2 illustrates an example block topology for a vehicle based computing system 40 (VCS) for the vehicle 20. The VCS 40 may include one or more controllers such as controller 42 that controls at least some portion of the operation of the vehicle-based computing system. Provided within the vehicle, the controller 42 allows onboard processing of commands and routines. The controller 42 includes a processor 44 that is connected to both non-persistent 46 and persistent storage 48. In this illustrative embodiment, the non-persistent storage is random access memory (RAM) and the persistent storage is a hard disk drive (HDD) or flash memory. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. It is to be understood that the controller 42 and one or more other controllers can collectively be referred to as a "controller" that controls various devices in response to signals from various sensors to control functions of the vehicle. Any reference in the claims to "a controller" refers to one or more controllers. Although not shown, numerous vehicle components and auxiliary components in communication with the VCS may use a vehicle network (such as a CAN bus) to pass data to and from the VCS (or components thereof). The controller 42 communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the processor 44.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems.

The vehicle 20 is configured to communicate with a network 50 allowing the vehicle 20 to send and receive data to and from one or more remote servers 52. For example, the vehicle may include an onboard modem 54 having an antenna 56 in order to communicate data between processor 44 and the network 50. In some embodiments, the modem 54 may establish communication with a cellular tower 58 for communicating with network 50. As a non-limiting example, modem 54 may be a USB cellular modem and the communication may be cellular communication. In some embodiments, the tower 58 may be a WiFi access point. The processor 44 could be connected to a vehicle-based wireless router 60, using for example a WiFi 62 transceiver. This allows the processor 44 to connect to remote networks in range of the local router 60.

A remote device 64 (such as a cell phone, tablet, PDA, or the like) can be used to communicate with the network 50 through a cellular network that includes tower 58 or through a WiFi connection. Using the network 50, the remote device 64 is able to communicate with one or more remote servers 52. This allows data to be communicated between the remote device 64 and the remote servers 52. For example, the remote device 64 may download/upload information from/to the remote server 52 that is associated with a delivery. This will be described in more detail below.

The vehicle 20 may include a plurality of Bluetooth low energy (BLE) devices 66. BLE is a wireless technology designed to provide for the communication of data between devices such the vehicle 20 and the remote device 64. As compared to Bluetooth, BLE offers communication of smaller amounts of data with reduced power consumption. The vehicle may communicate with the remote device 20 via the BLE devices 66, the wireless module 60, and/or the modem 54. The controller 42 may be configured to determine a wireless signal strength between the BLEs 66 and the remote device 64, and calculate a distance between the BLEs 66 and the remote device 64. Using trilateration, for example, the controller 42 can determine the location of the remote device 64 relative to the vehicle 20 based on the signal strength. Proximity and triangulation methods could also be used to determine the location of the remote device 64 relative to the vehicle 20.

The controller 42 is in electronic communication with the storage system 28 so that one or more of the locks 34 can be automatically unlocked by the controller 42 in response to an intended recipient of the delivery providing sufficient information to the vehicle to verify their identity. Sufficient information may be an access code. The access code may be provided to the user in the form of a machine-readable barcode such as a 1-D barcode (UPC) or a 2-D barcode (QR code). For example, the remote device 64 may receive a barcode from a remote server 52 associated with the delivery via text message. The barcode is a graphical representation of an access code used to open one or more of the storage compartments 30 on the delivery vehicle 20. The vehicle 20 may include a scanner system 70 configured to read barcodes off the remote device 64 or a traditional medium, such as paper or cardboard. The scanner system 70 is in electrotonic communication with the processor 44. The controller 42 includes machine-readable instructions stored in memory 46, 48 for decoding the barcode and comparing the decoded barcode to a database of access codes that correspond with the storage compartments 30. The database of access codes may be locally stored on the vehicle or be stored in a remote location that is accessible by the vehicle via the network 50. If the controller 42 identifies that the scanned barcode matches the access code of one or more of the storage compartments 30, then the controller 42 unlocks one or more of the storage compartments 30 allowing the intended recipient to retrieve his/her package from the vehicle 20.

Figure 3:
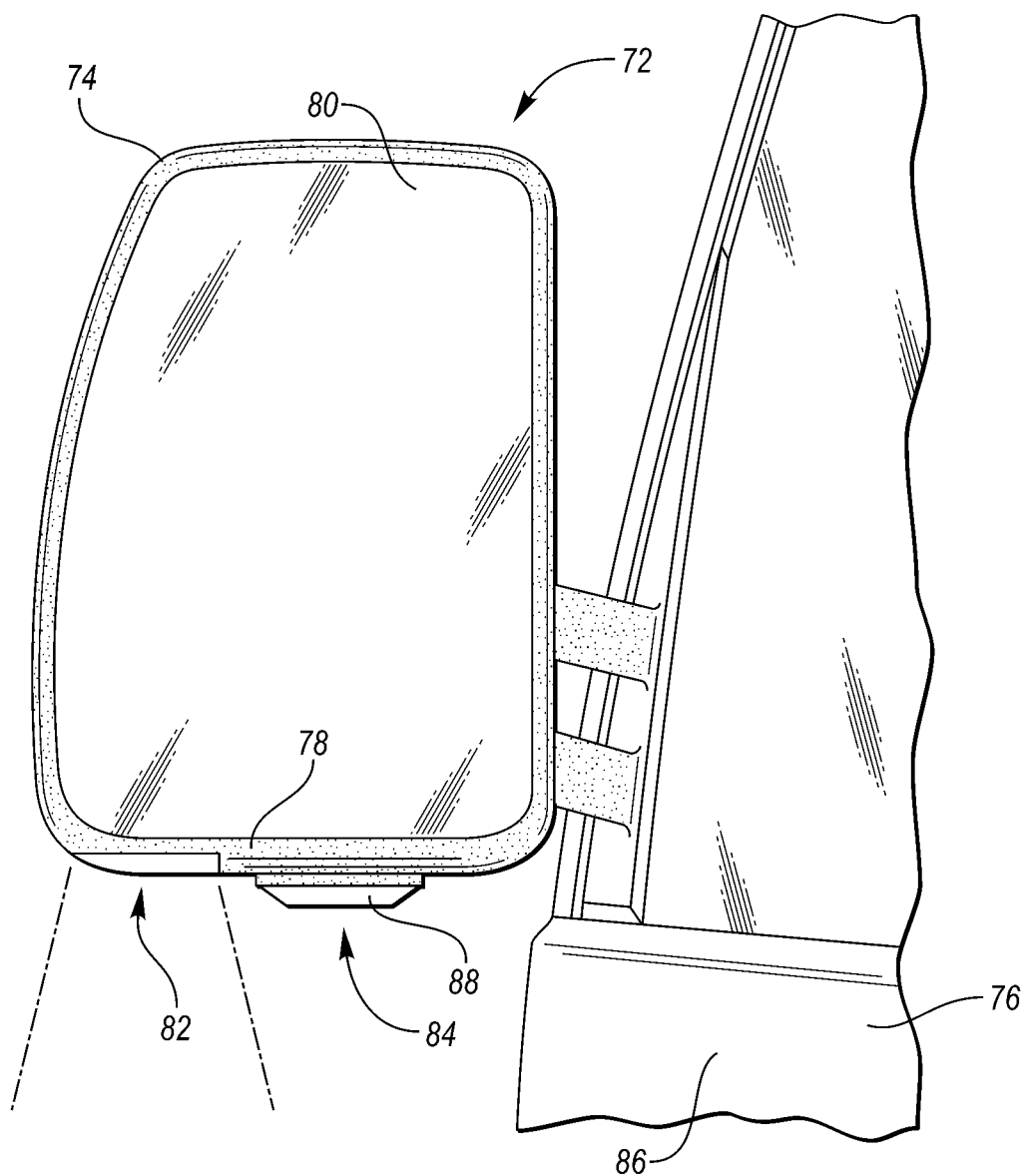
FIG. 3 is a diagrammatical view of a side-mirror assembly of a vehicle.

Referring to FIG. 3, in one embodiment, the scanner assembly 70 is disposed within a side-mirror assembly 72 of the vehicle 20. The vehicle 20 may include a single scanner assembly 70 located in one of the side mirrors or may include a scanner assembly in both of the side mirrors allowing the user to approach the delivery vehicle 20 from either side. The side-mirror assembly 72 includes a housing 74 that may be attached to a door 76 of the vehicle. The housing 74 includes a bottom portion 78 and a mirror 80.

The scanner assembly 70 may include a light source and an imager configured to read barcodes. In one embodiment, the light source is a puddle light 82. The puddle light 82 may be provided on the bottom portion 78 near an outer end of the housing 74. The puddle light 82 is aimed to illuminate the area under the side-mirror assembly 72 including the door panel 86. The imager may be a camera 84 that is disposed on the bottom portion 78 of the housing 74. The camera 84 may include electronic components disposed within the housing 74 and a lens 88 that is external to the housing 74. The camera 84 may be aimed to have a field-of-view generally below the mirror assembly 72, which is within an area illuminated by the puddle light 82 when the light is ON. The camera 84 may have dual duties and serves not only as a barcode scanner, but also to capture video or images for the vehicle vision system. Alternatively, the imager may be a dedicated scanner for reading barcodes.

The puddle lamp 82 may be used to communicate information to the intended recipient once the vehicle 20 arrives at the delivery location. In one embodiment, the puddle lamp 82 simply emits white light to notify the intended recipient that the vehicle 20 is the delivery vehicle and to illuminate the area under the camera 84. In other embodiments, the puddle light 82 may be configured to illuminate the area in different colors or create textual messages in order to communicate instructions associated with the delivery to the intended recipient. The colors may include a red light to indicate the scanning area and a green light to indicate that the scan was successful. Textual messages may include messages such as "SCAN HERE" to indicate the scanning location to the intended recipient, and "SCAN SUCCESSFUL" to indicate that the scan was accepted. The light/text may be projected on to the ground or a body panel of the vehicle such as the panel 86. These are merely illustrative examples and this application is not limited to any particular textual message or color combinations.

Figure 4:
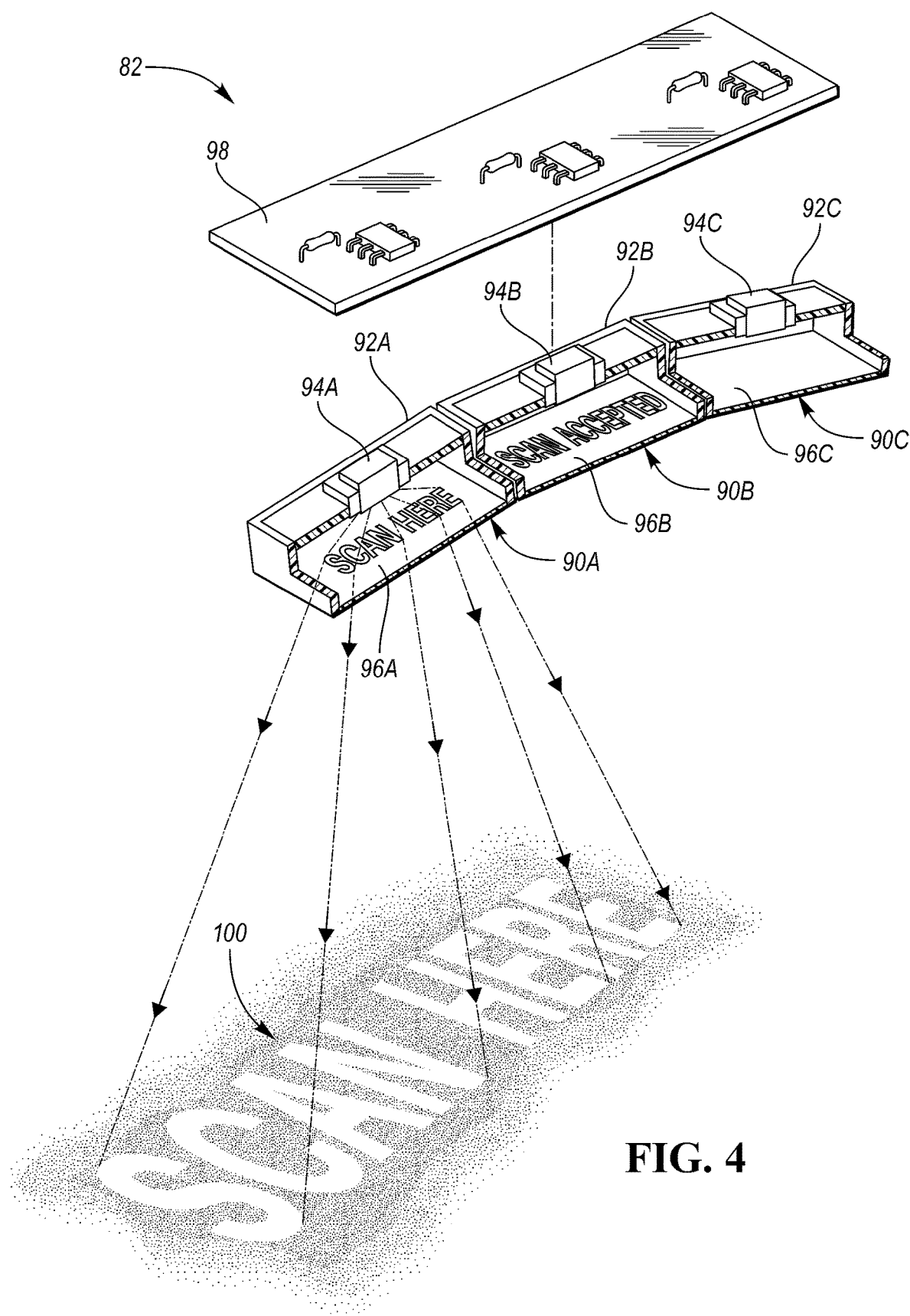
FIG. 4 is a diagrammatical view of a puddle lamp and an image generated by the puddle lamp.

Referring to FIG. 4, in one embodiment, the puddle lamp 82 includes a plurality of light projectors 90, such as the three light projectors 90A-90C illustrated. The light projectors 90 may be arranged in a linear array and oriented to illuminate the same general area under the side-mirror assembly 72. Each of the light projectors 90 includes a housing 92, a light source 94, and an image filter 96. The light source 94 may be light emitting diodes (LEDs). The light projectors 90 are configured to display different images. This may be accomplished by using different image filters. The image filter 96*a* of the light projector 90*a* is configured to display a textual message that provides instructions to the intended recipient. This may include where to scanner the remote device, such as the "SCAN HERE" message 100 shown. The image filter 96*b* of the light projector 90*b* is configured to display a textual message that notifies the intended recipient that the barcode was accepted, such as a "SCAN ACCEPTED" message. The image filter 96*c* of the light projector 90*c* is blank to simply transmit light produced by the light source 94*c*. Light projector 90*c* may be used in operations of the puddle lamp 82 related to, and unrelated to, scanning operations.

A circuit board 98 may control operations of each of the light projectors 90. The circuit board 98 may be in communication with the controller 42 via the VCS 40. The circuit board 98 is programmed to illuminate one of the light projectors 90 at a time to illuminate the area as desired. If the intended recipient is approaching the vehicle to scan the remote device, the circuit board 98 may energize the light projector 90*a* to illuminate the SCAN HERE image pattern 100 on the ground or on an exterior portion of the vehicle such as the door 76. The circuit board 98 may energize other light projectors to illuminate different or no images in other situations.

In another embodiment, the puddle light 82 may be configured to emit different wavelengths of light to illuminate the area under the side-mirror assembly 72 in different colors. This may be done by having a plurality of light projectors with different filters for transmitting various wavelengths of light or the light sources themselves may be configured to emit different wavelengths light, e.g., different LEDs could be used in the light projectors.

The scanner assembly 70 may cooperate with photoluminescent structures disposed on the vehicle to create visual indicators associated with the delivery. For example, the photoluminescent structures may be configured to display different colors and/or textual messages to the intended recipient. The photoluminescent structures may be located on a body panel of the vehicle such as an exterior panel of the door. The photoluminescent structures may be embedded in the paint on the exterior panel, or may be provided on a sticker or decal that is attached to the exterior panel by a nonremovable connection, e.g., adhesive, or by a removable connection, e.g., a magnet.

The photoluminescent structures may include a substrate, e.g., the vehicle body, an energy conversion layer disposed over the substrate, a stability layer disposed over the energy conversion layer, and a protective outer layer. Some of these layers are optional. The energy conversion layer may include one or more photoluminescent materials having energy converting properties with phosphorescent or florescent properties. The photoluminescent materials may become excited upon receiving an imputed light of a specific wavelength, thereby causing the light to undergo a conversion process. Under the principle of down conversion, the inputted light is converted into an outputted light of longer wavelength that is outputted from the photoluminescent structure. Conversely, under the principle of down conversion, the inputted light is converted into an outputted light of shorter wavelength that is outputted from the photoluminescent structure. When multiple distinct wavelengths of light are outputted from the photoluminescent structure at the same time, the wavelengths of light may mix together to be expressed as a multicolored light. The light emitted by the light source, e.g., the puddle lamp 82, is referred to as the inputted light and the light emitted from the photoluminescent structure is referred to as the outputted light.

The photoluminescent materials may include organic or inorganic fluorescent dyes, e.g., rylenes, xanthenes, porphyrins, and phthalocyanines, and/or phosphors. These different photoluminescent materials react to different wavelengths of imputed light to produce various colors of outputted light. For example, green light can be generated by projecting blue light on to XXXXX, and red light can be generated by projecting ultra violet light on to a phosphor such as $Y_2O_2S$: Eu.

The photoluminescent materials may be evenly scattered within an area to create an generally uniform luminescene in that area. For example, two different photoluminescent materials may be evenly distributed on the door panel under the side-mirror assembly allowing that area to be illuminated as a first color, e.g., red, prior to the scan being accepted and as a second color, e.g., green, in response to the scan being accepted. Alternatively, the photoluminescent materials may be arranged to form a textual message such as SCAN HERE or SCAN ACCEPTED.

Figure 5:
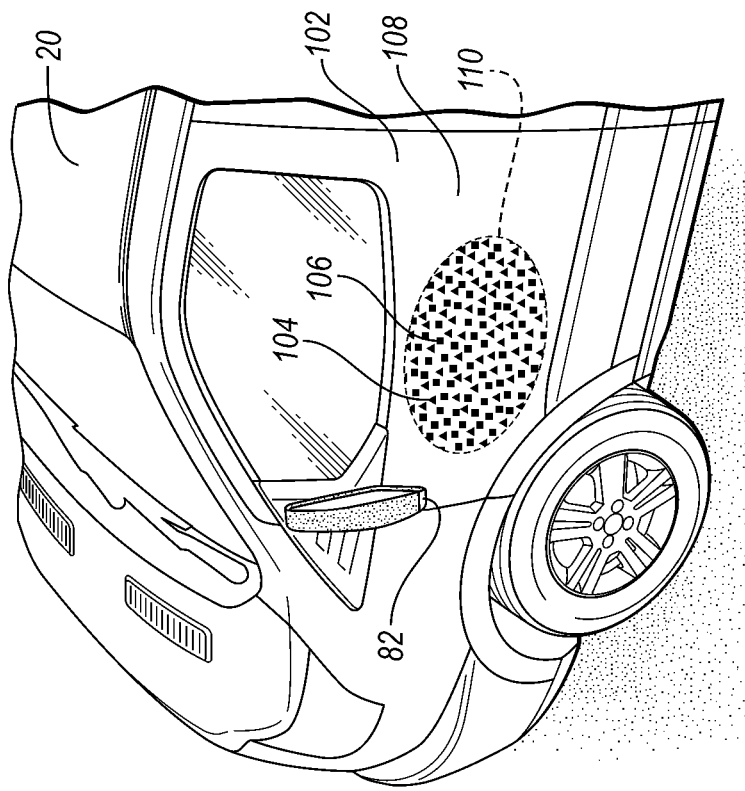
FIG. 5 is a diagrammatical view of a scanner assembly and a door panel having photoluminescent materials.

Referring to FIG. 5, the vehicle 20 may include a door panel 102 having a first photoluminescent material 104 and a second photoluminescent material 106 embedded within the paint 108. The first photoluminescent material 104 is configured to luminesce red light in response to the puddle light 82 projecting a first wavelength of light onto the door panel 102. The second photoluminescent material 106 is configured to luminesce green visible light in response to the puddle lamp 82 projecting a second wavelength of light onto the door panel 102. The first and second photoluminescent materials 104 and 106 are dispersed within an area 110 of the door panel 102 causing that area of the panel 102 to luminesce when the photoluminescent material is excited. The controller 42 is programmed to selectively command the puddle lamp 82 to project the first and second wavelengths of light onto the door panel 102 in order to create the visible indicators, e.g., different colors of light, to the intended recipient such as where to scan and if the scan was successful. Alternatively, the first and second photoluminescent materials 104 and 106 may be disposed on a decal that is attached to the door rather than embedded within the paint.

Figure 6:
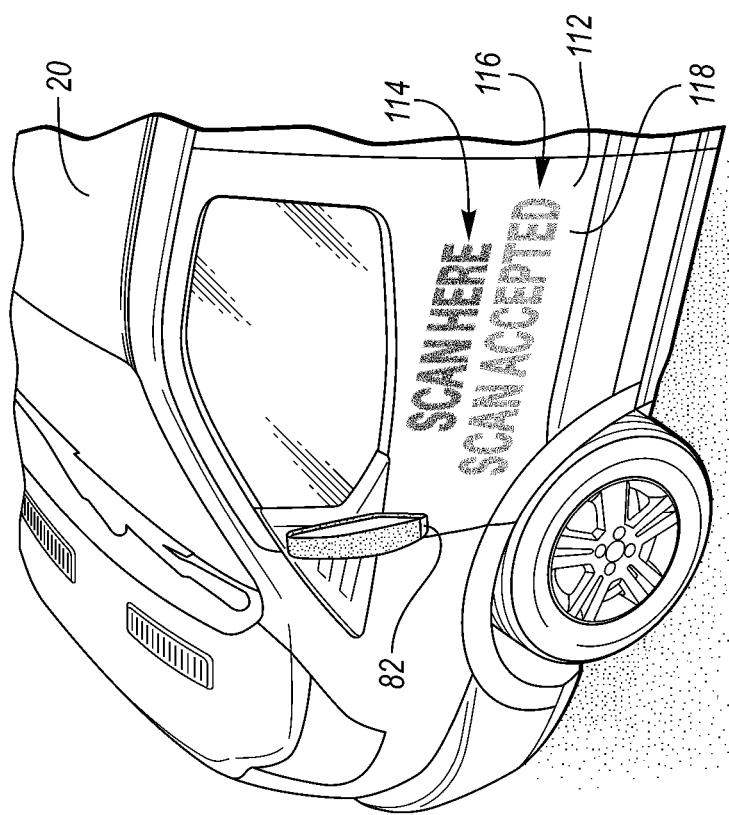
FIG. 6 is a diagrammatical view of another scanner assembly and a door panel having photoluminescent materials.

Referring to FIG. 6, the vehicle 20 may include a door panel 112 having a first photoluminescent material 114 arranged to create a first textual message, e.g., SCAN HERE, and a second photoluminescent material 116 arranged to create a second textual message, e.g., SCAN ACCEPTED. These two textual messages may be arranged side-by-side or may be superimposed. The photoluminescent materials 114 and 116 may be embedded in the paint 118 of the door panel 112 or may be disposed on a decal. Alternatively, the area surrounding the letters may include the photoluminescent material in order to create the textual message rather than the letters being the photoluminescent material. The concepts of FIGS. 5 and 6 can be joined together to form another embodiment that includes both different color indicators as well as textual messages.

Figure 7:
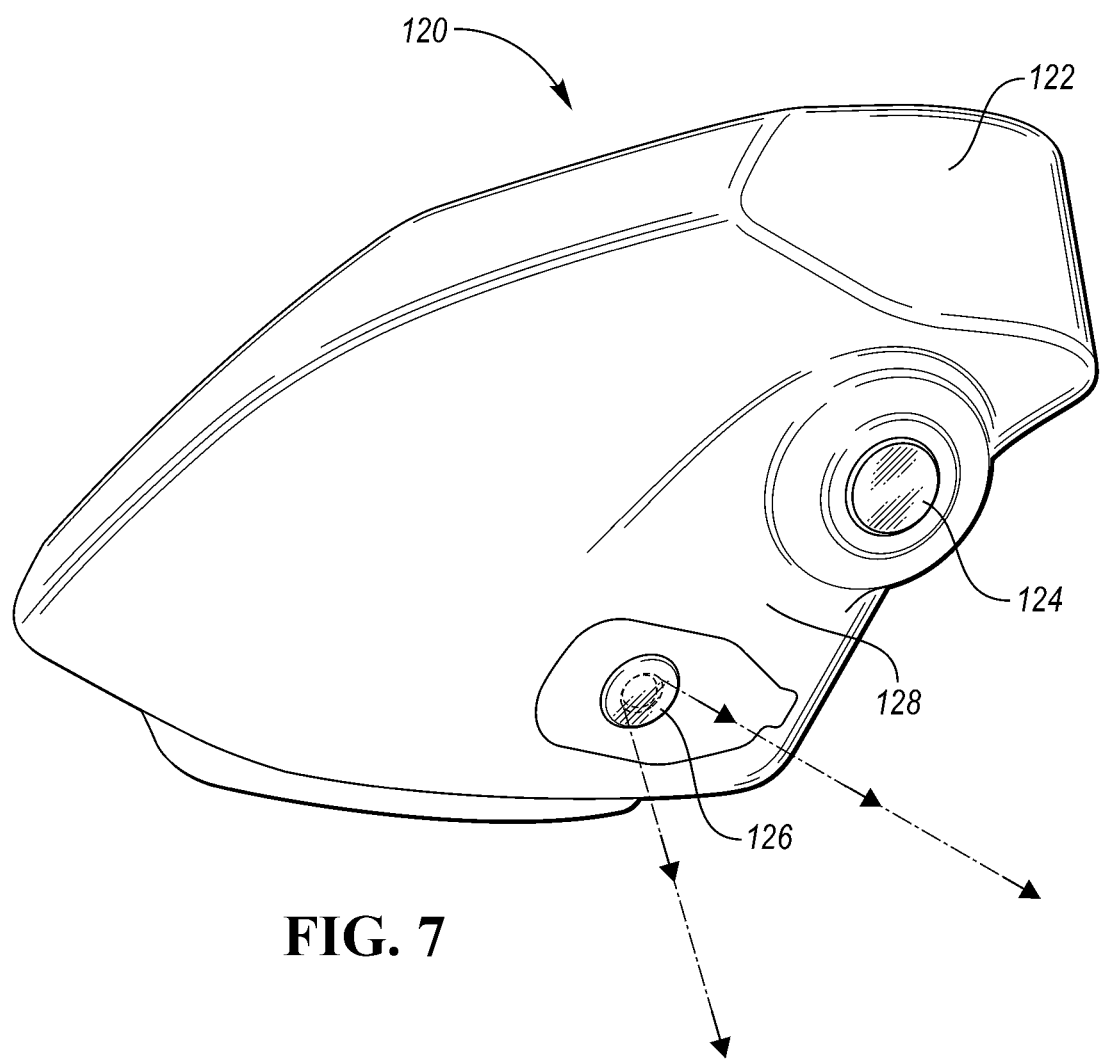
FIG. 7 is a perspective view of a scanner assembly.

Referring to FIG. 7, in some embodiments, the vehicle 20 may only be operated autonomously, i.e., the vehicle does not include controls to enable manual operation of the vehicle. In this type of vehicle, side-view mirrors are not included as they are unnecessary for computer driving. In a fully autonomous vehicle with no manual operation, the side-view mirrors may be replaced with cameras. In one embodiment, the vehicle 20 includes a camera assembly 120 disposed on an exterior surface of the vehicle body such as at a location where side-view mirrors are typically placed. The camera assembly 20 may include a housing 122 that supports the camera 124 and a light source 126. The camera 124 may be a fisheye camera having a large viewing window. The camera 124 and light source 126 may be disposed on a bottom portion 128 of the camera assembly 120. The light source 126 may be aimed to illuminate an area in a field of view of the camera 124. In addition to forming a portion of the vision system, the camera 124 may be configured to read barcodes so that the camera 124 can be used as a scanner for the verify authorization during deliveries. The side-mirror assembly 72, described above, may be substituted for the camera assembly 120 in all of the above described embodiments.

The vehicle 20 may be utilized to deliver many different types of goods such as packages, food, and the like. The vehicle 20 may be operated directly by the producer of the goods, e.g., a take-out pizza company, or by a third party, e.g., a courier. These operators may be referred to as the "company". The company may provide a mobile application that can be downloaded onto a remote device. Using the mobile application, a person can place an order for delivery and provide the delivery address. The mobile application may determine the nearest hub and send the order there. Once the order is complete, the order is loaded into one or more storage compartments 30 of the autonomous delivery vehicle 20. That delivery may be tagged with an access code that permits access to the storage compartments containing the delivery. The lock 34 of the storage compartments 30 can be opened electronically when the correct access code is provided to the vehicle.

Once the delivery is assigned an access code, the mobile application may provide a barcode to the remote device allowing the intended recipient to unlock the storage compartment(s) and retrieve his/her delivery. The barcode could also be sent to the remote device via text message. The mobile application may be configured to notify the intended recipient when the vehicle arrives and may provide an estimated time of arrival. In one embodiment, the mobile application may include a dynamically updated map that shows the current location of the delivery vehicle and the estimated time of arrival. Once the vehicle arrives, the intended recipient may retrieve his/her package by presenting the barcode to the scanner system located on an exterior of the vehicle to unlock the storage compartment(s). The person may then remove the package from the unlocked storage compartment.

Figure 8:
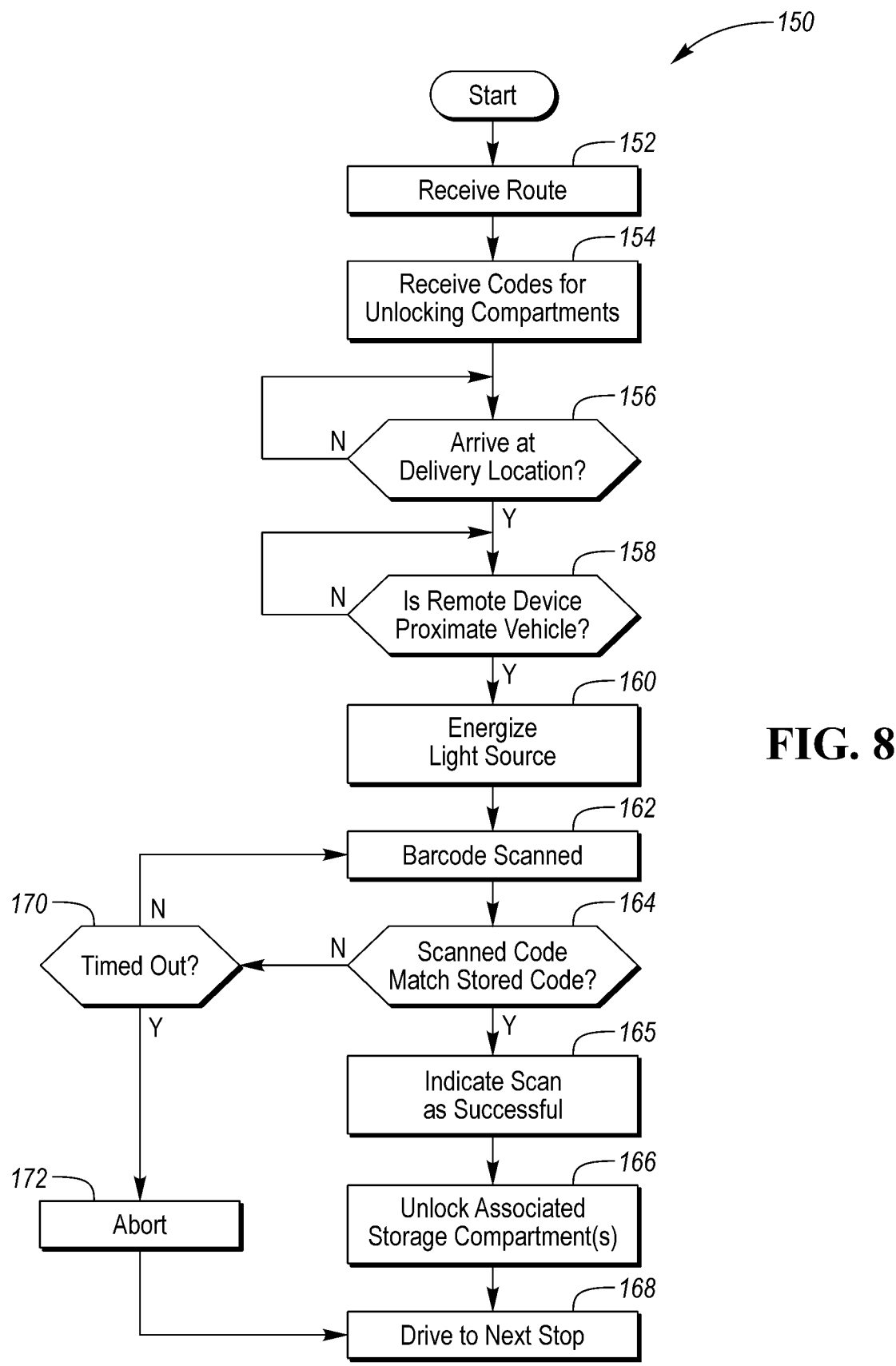
FIG. 8 is a flow chart illustrating an algorithm for operating aspects of the autonomous delivery vehicle.

Referring to FIG. 8, a flow chart 150 illustrates a process for delivering packages using an autonomous vehicle according to one embodiment. Prior to vehicle departure, the storage compartments of the vehicle are loaded with packages for delivery. Each of these packages may be associated with an access code assigned to that storage compartment for this delivery and this addressee. The addresses for each addressee of this delivery cycle are compiled and a pre-planned route may be generated. At operation 152, the vehicle controller receives the route data, which may be used by the navigation module, in conjunction with other system of the vehicle, to autonomously drive the vehicle to the various stops. At operation 154, the access codes for unlocking the storage requirements are received by the vehicle controller. Once the route is underway, the controller periodically determines if the vehicle has arrived at one of the delivery locations as shown by operation 156.

Once the vehicle arrives at a delivery location the controller proceeds to operation 158 and determines if the remote device associated with that delivery is within a threshold distance of the vehicle. The threshold distance may be 5 to 50 feet from the vehicle. The person's proximity to the vehicle may be determined by monitoring a wireless signal between the person's remote device and one or more devices of the vehicle. For example, the vehicle may include a plurality of BLE devices that are wirelessly connected to the remote device. Triangulation or trilateration using these signal strengths may be used to determine the location of the remote device relative to the vehicle.

The controller may be programmed to energize the light source of the scanner system in response to the intended recipient being proximate the vehicle as shown at operation 160. As explained above, the light source may simply illuminate an area with white light or the vehicle may be configured to communicate a message associated with the delivery at operation 160. The message may be visible colors, textual, audio, or combinations thereof.

Once the light source is energized at operation 160, the vehicle stands by awaiting a correct barcode. The camera is configured to recognize when a remote device is disposed in a field of view of the imager and in response to one being present, scans the barcode displayed on the screen of the remote device at operation 162. The image captured by the imager is sent to the controller, which decodes the barcode and determines if the scanned barcode matches the previously received access code for the storage compartments of this delivery. If yes, the controller commands the locks of those storage compartments to open at operation 166 so that the intended recipient may retrieve the packages from those storage compartments. Once the items have been removed by the intended recipient, the vehicle continues to the next stop at operation 168.

If the scanned barcode did not match any of the stored codes, then control passes operation 170 and the controller determines if the period for scanning has timed out. If yes, control passes to operation 172 and this delivery is aborted. The scanning may be timed out if a predetermined amount of time has elapsed or if a predefined number of potential scans is exceeded. If the scanning period has not timed out at operation 170, control passes back to operation 162 and the imager again scans the barcode on the remote device. If that scan is successful, control passes to operation 166 and the storage compartment(s) is unlocked.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a storage compartment configured to house a package for delivery;
   a side-mirror assembly including an imager and a puddle light aimed to illuminate an area in a field of view of the imager; and
   a controller programmed to
   receive data representing a code associated with the delivery,
   energize the puddle lamp to illuminate the area, and
   unlock the storage compartment responsive to the imager detecting an image encoding data matching the code.

2. The vehicle of claim 1, wherein the controller is further programmed to energize the puddle light responsive to an intended recipient of the delivery being within a threshold distance of the vehicle.

3. The vehicle of claim 1, wherein the puddle light includes a light source and an image filter located in front of the light source configured to generate a textual message associated with the delivery.

4. The vehicle of claim 3, wherein the textual message includes at least one of the words SCAN and HERE.

5. The vehicle of claim 1, wherein the puddle light is configured to emit at least two different colors of visible light, and the controller is further programmed to (i) energize the puddle light to illuminate the area in a first of the colors responsive to an intended recipient of the delivery being within a threshold distance of the vehicle, and (ii) energize the puddle light to illuminate the area in a second of the colors responsive to the imager sensing a barcode matching the code.

6. The vehicle of claim 1 further comprising a body that includes the side-mirror assembly, the storage compartment, and a door panel, the door panel supporting a photoluminescent structure configured to emit luminescence responsive to excitation by the puddle lamp.

7. The vehicle of claim 6, wherein the luminescence includes a textual message.

8. The vehicle of claim 6, wherein the photoluminescent structure includes a first photoluminescent material configured to emit a first luminescence and a second photoluminescent material configured to emit a second luminescence that is distinguishable from the first luminescence by human eye, and the controller is further programmed to (i) command the puddle light to emit a first wavelength of light to generate the first luminescence from the photoluminescent structure responsive to an intended recipient of the delivery being within a threshold distance of the vehicle, and (ii) command the puddle light to emit a second wavelength of light to generate the second luminescence from the photoluminescent structure responsive to the imager detecting the image containing data matching the code.

9. The vehicle of claim 8, wherein the first luminescence is a first color of visible light and the second luminescence is a second color of visible light.

10. The vehicle of claim 8, wherein the first luminescence includes a first textual message and the second luminescence includes a second textual message.

11. The vehicle of claim 1, wherein the vehicle further includes blue tooth low energy (BLE) devices configured to communicate with a remote device of the intended recipient, and wherein the controller is further programmed to energize the puddle light responsive to the remote device being sensed within a threshold distance of the vehicle based on a signal strength between the remote device and at least one of the BLE devices.

12. A vehicle comprising:
    a body including a storage compartment configured to house an item for delivery and having an electronically controlled lock;
    a scanning assembly disposed on an outer surface of the body and including an imager configured to read an image encoding data and a light source configured to illuminate an area in a field of view of the imager; and
    a controller programmed to,
    receive data representing a code associated with the delivery,
    energize the light source to display a message related to the delivery responsive to a remote device of an intended recipient of the delivery being within a threshold distance of the vehicle, and
    unlock the lock responsive to the imager detecting an image encoding data displayed by the remote device that matches the code so that the intended recipient can access the item in the storage compartment.

13. The vehicle of claim 12 further comprising a side-mirror assembly supported on the body, wherein the scanning assembly is disposed in the side-mirror assembly.

14. The vehicle of claim 12, wherein the light source is a puddle light and the imager is a camera.

15. The vehicle of claim 12, wherein the message includes text that provides instruction associated with the delivery.

16. The vehicle of claim 12 further comprising photoluminescent material embedded in paint applied to an area of the body that is illuminated by the light source when energized, and wherein the message is displayed by luminescence from the photoluminescent material responsive to the light source emitting light at a frequency that excites the photoluminescent material.

17. A vehicle comprising:
   a body including a storage compartment for housing a package;
   a scanning assembly connected to the body and including an imager configured to read a barcode displayed by a remote device; and
   a controller programmed to
      receive an access code, from a remote server, for the storage compartment, and
      unlock the storage compartment responsive to the imager sensing a barcode, displayed by the remote device, that matches the access code.

18. The vehicle of claim 17, wherein the scanning assembly further includes a light source, and wherein the controller is further programmed to, responsive to the remote device being within a threshold distance of the vehicle, energize the light source to illuminate an area in a field of view of the imager.

19. The vehicle of claim 18, wherein the scanning assembly further includes an image filter located in front of the light source and configured to generate a textual message that provides instructions associated with retrieving the package.

20. The vehicle of claim 17 further comprising a side-mirror assembly supported on the body, wherein the scanning assembly is disposed in the side-mirror assembly.

* * * * *